United States Patent [19]
Baird

[11] Patent Number: 5,139,728
[45] Date of Patent: Aug. 18, 1992

[54] METHOD OF USING MOLDING POT HAVING CONFIGURED BOTTOM

[75] Inventor: John Baird, Scottsdale, Ariz.

[73] Assignee: Motorola, Inc., Schaumburg, Ill.

[21] Appl. No.: 674,015

[22] Filed: Mar. 25, 1991

Related U.S. Application Data

[62] Division of Ser. No. 479,501, Feb. 13, 1990.

[51] Int. Cl.⁵ .................. B29C 45/02; B29C 45/26
[52] U.S. Cl. .................. 264/272.17; 264/272.11; 264/328.4; 264/328.5; 264/328.12; 264/328.17; 425/129.1; 425/544
[58] Field of Search ............... 264/272.13, 272.17, 264/328.4, 328.5, 328.12, 272.11, 328.17; 425/544, 129.1

[56] References Cited

U.S. PATENT DOCUMENTS

| | | | |
|---|---|---|---|
| 3,989,793 | 11/1976 | Hertel et al. | 264/329 |
| 4,554,124 | 11/1985 | Sera | 264/328.5 |
| 4,708,613 | 11/1987 | Sera et al. | |

Primary Examiner—Jan H. Silbaugh
Assistant Examiner—Angela Ortiz
Attorney, Agent, or Firm—Joe E. Barbee

[57] ABSTRACT

A molding apparatus for encapsulating devices and having at least one molding pot wherein the pot has a configured bottom is used. The configured bottom serves as a shearing force against encapsulating material pellets which are pressed into the configured bottom by a plunger. The shearing force increases the fluidizing action of the pellets thereby lowering the viscosity of the encapsulating material so it easily enters cavities provided in the molding assembly and completely fills the cavities and encapsulates the devices without damage to the devices.

8 Claims, 1 Drawing Sheet

METHOD OF USING MOLDING POT HAVING CONFIGURED BOTTOM

This is a division of application Ser. No. 07/479,501, filed Feb. 13, 1990.

BACKGROUND OF THE INVENTION

This invention relates, in general, to mold assemblies, and more particularly, to a method of using a molding assembly wherein its molding pot has a configured bottom.

Molding assemblies have been used for some time to encapsulate semiconductor devices. A molding assembly typically has a plurality of cavities in which the device being encapsulated is located. A receptacle commonly called a pot is located on the molding assembly to receive the encapsulating material. Some molding assemblies have more than one pot. Runners connect the cavities to the molding pot. A plunger or ram is used to force the encapsulating material in the pot into the runners and into the cavities. Typically the molding assembly is heated to a temperature which will cure the encapsulating material. The encapsulating material is generally a thermoset epoxy which cures at approximately 170° C.

Although this type of a molding apparatus works reasonably well, some shortcomings do exist. As an example, during encapsulation the encapsulating material can cause the thin connecting wires on the semiconductor device to be dislodged, which is commonly referred to as wire sweep. In addition, voids can occur in the encapsulating material itself, thereby not providing ideal encapsulation. It appears that the dislodging of the fine wires is a result of the failure of the encapsulating material to be sufficiently fluidized during injection into the cavity. Another cause may be that the encapsulating material is injected under too high of a pressure. It is believed that the voids are sometimes caused by the lack of fluidization of the encapsulating material, or by a chase or runner jamming mechanism which occurs when the encapsulating material starts to solidify before it reaches the desired voids in the cavity. As additional encapsulating material is forced down the runners the partially solidified material enters the cavity but fails to completely fill the cavity. Multi-pot molds have been used in an attempt to overcome some of the problems of a single-pot mold; however, very high pressures are required in order to obtain a good encapsulation. By now it should be appreciated that it would be desirable to have an improved molding apparatus and method of encapsulation.

Accordingly, it is an object of the present invention to provide an improved molding assembly and method of use.

Another object of the present invention is to provide a method of using a molding assembly wherein the pot has a configured bottom.

Yet another object of the present invention is to use a molding assembly which will result in a superior encapsulation at lower pressures.

Yet another object of the present invention is to provide a method for using an improved molding pot which results in a better fluidization of an unheated encapsulating material pellet.

SUMMARY OF THE INVENTION

The above and other objects and advantages of the present invention are provided by a molding pot having a configured bottom. The configured bottom of the molding pot increases the surface area of the bottom of the pot and provides greater shear area. The shearing area greatly facilitates the fluidization of a pellet of encapsulating material. In addition, the configured bottom of the molding pot prevents the pellets from blocking ports in the bottom of the molding pot which are connected to runners. The runners are in turn connected to cavities. The configured bottom of the molding pot has at least one projection which extends up into the pot and in addition to providing a shearing surface for the pellet also tends to grip the pellet to prevent the pellet from blocking the ports. The improved fluidization of the encapsulating material prevents voids in the encapsulated item and also prevents wire sweep from occurring.

DETAILED DESCRIPTION OF THE DRAWINGS

Figure 1:
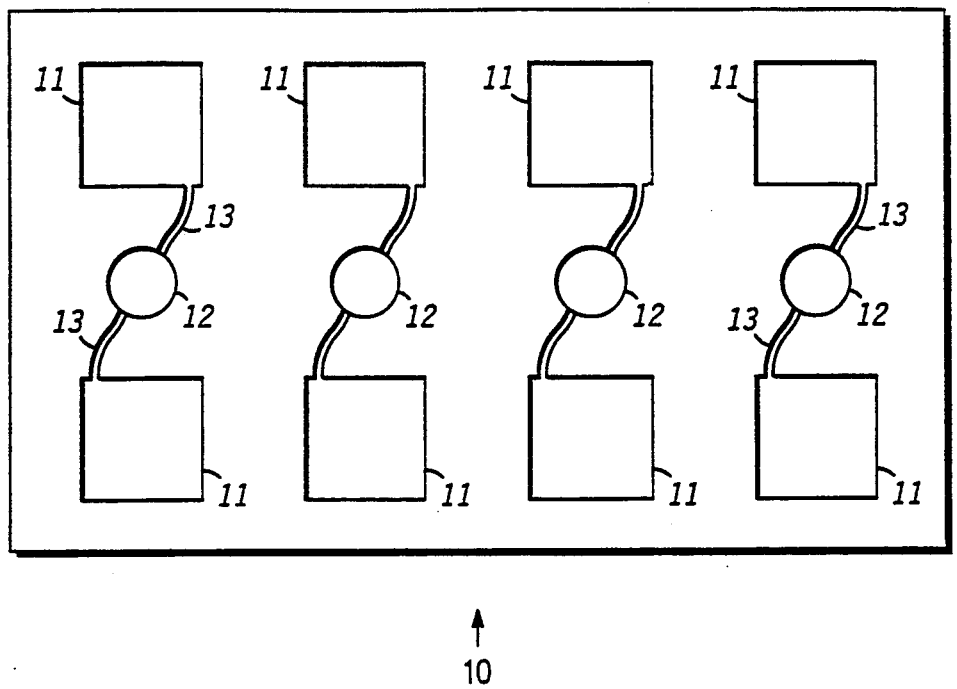
FIG. 1 is a pictorial representation of a plan view of a mold assembly.

FIG. 1 is a pictorial representation of a multi-pot mold assembly 10. As illustrated, mold assembly 10 has eight cavities 11. Typically the item being encapsulated is located or placed within cavity 11. Four pots 12 are illustrated. Each pot 12 is connected by a chase or runner 13 to two cavities 11. It will be understood that molding assembly 10 is illustrated as an example only and not as a limitation to the present invention. In other words, the present invention can be used in a mold assembly having only one molding pot connected by runners to all the cavities or can also be used in a molding assembly wherein each cavity is connected to a separate molding pot. The number of cavities or pots on a mold assembly is not limited by the present invention.

Typically, encapsulating material in the form of pellets is placed in molding pots 12. Mold assembly 10 is maintained at a temperature which will cure the encapsulating material. The pellet or pellets are then forced by a ram or plunger 14 to the bottom of pots 12 and rendered into a mallable or fluidized form so that the resulting encapsulating material will flow through runners 13 into cavities 11. In a conventional multi-pot molding assembly it was found that a pressure of 80 kg/cm$^2$ was required in order to force the encapsulating material into cavities 11. This process took 4.5 seconds. By use of the present invention, a pressure of approximately 28 kg/cm$^2$ can be used and the encapsulating process can be completed in 1.2 seconds. As an example, mold assembly 10 is heated to approximately 160° C. to 190° C. and the encapsulating material is a thermoset epoxy. The reduced operating pressure allowed by the present invention increases the lifetime of the runners, the ram tip seals, the mold cavities, and the gates or openings leading into the mold cavities. In addition, the lower pressure permits use of a plastic seal for the plunger or ram which will result in an extended lifetime of the pots themselves.

Figure 2:
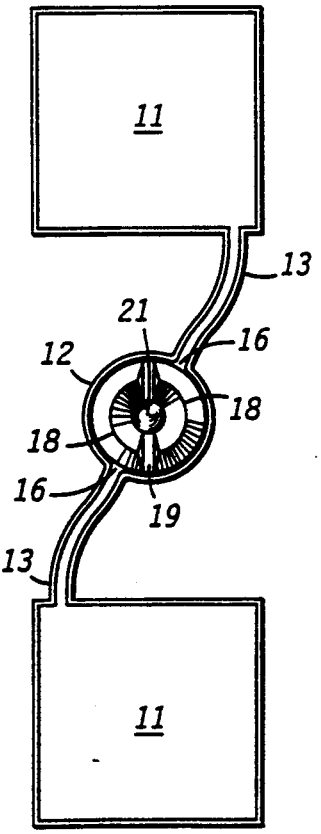
FIG. 2 is a plan view of a portion of the mold assembly of FIG. 1 illustrating the present invention.

FIG. 2 illustrates, as a plan view, two cavities 11 connected to one mold pot 12. The bottom configuration of mold pot 12 is shown in greater detail than in FIG. 1. Wire sweep seems to be a function of the viscosity of the encapsulating material during the time the cavity is being filled. Therefore, the encapsulating material must be completely fluidized. In FIG. 2, the gate is the opening of cavity 11 which is connected to runner 13. Maximum shear flow thinning, or maximum encapsulating material fluidization will occur at near the maximum possible flow rate. This will result in the encapsulating material being at the minimum viscosity and because of the rapid flow rate between pot 12 and cavity 11 the encapsulating material will be at the lowest possible temperature upon its arrival into cavity 11. This has an important impact upon the quality of the encapsulation of the semiconductor device located within cavity 11, particularly where the encapsulating material is a fast reacting compound.

In the past, some thought that in order to reduce wire sweep that the transfer velocity of the encapsulating material should be decreased. This was a result of thinking that the higher pressure or transfer rate of the encapsulating material was causing wire sweep. If the transfer process was slowed down the wire sweep problem would remain unchanged or become worse because the heated runners would commence curing the slow flowing compound. In the use of the present invention it has been found that increasing the transfer speed of the encapsulating material reduces viscosity and lowers the temperature of the encapsulating material. As mentioned hereinbefore, typically a molding assembly is maintained at an elevated temperature which is required in order to cure the encapsulating material.

The fluidization of the encapsulating material is greatly enhanced by the configured bottom of mold pot 12. Mold pot 12 has a circular projection 18 extending upward from its bottom. Circular projection 18 is divided into two halves by slot or gap 19. A cone-shaped projection 21 has its peak extending upward in the center of circular projection 18. Projection 18 has a peak which slopes toward the bottom of pot 12 at an angle of approximately 60°. The same is true of cone 21 which has a peak which slopes toward the bottom of pot 12 at an angle of 60°. The surface area provided by protrusions 18 and 21 is approximately equal to twice the surface area of a flat bottomed pot. Protrusions 18 and 21 also lock in position pellets of the encapsulating material. Pot 12 is illustrated as having two openings 16, each of which is connected to a runner 13 to transport fluidized encapsulating material to cavities 11. Note that slots 19 are oriented away from opening 16 so that only mostly fluidized encapsulating material reaches opening 16. This prevents fragments of the pellets in the encapsulating material from blocking or plugging up opening 16. The plugging of an opening 16 will cause uneven filling of cavities 11. Slots 19 provide a passage for fluidized material which occurs or collects inside of circular projection 18. In normal operation a ram or plunger forces the pellets of the encapsulating material down onto projections 18 and 21 thereby fluidizing the pellets and causing it to flow out of pot 12 through openings 16.

Figure 3:
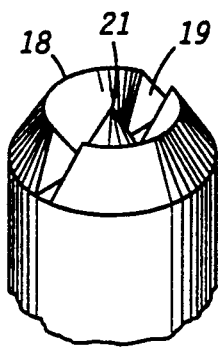
FIG. 3 is an isometric view of the configured bottom of the mold pot of FIG. 2.

FIG. 3 illustrates an isometric view of the bottom configuration of pot 12. Although this configuration has been found to be extremely successful in rapidly fluidizing the encapsulating material, other configurations also have been found to improve the fluidization of the encapsulating material. As an example, a plurality of cones or pyramids could be positioned in the bottom of pot 12. Even a projection having a flat top with sloping sides towards the sides of pot 12 and a slot such as a slot 19 cut through the substantially flat projection has been found to improve the fluidization of the encapsulating material over a totally flat bottom. However, the projection or configured bottom of pot 12 should be arranged in a manner to lock the pellets in place and prevent blocking of opening 16. It should be noted that the slope of projection 18 terminates at the bottom of pot 12, even though in FIG. 3 the configured bottom is illustrated as continuing downward.

In use of the present invention, preheating of the encapsulating material pellets is not required. As soon as the pellets are placed within pot 12 the ram or plunger forces the pellets against the projections protruding from the bottom and the shear force fluidizes the pellets thereby causing the encapsulating material to easily flow into cavities 11. Since the encapsulating material is greatly fluidized, wire sweep, or displacement of the thin wires making connection to the semiconductor device is prevented. In addition, since the encapsulating material is in such a fluidized state it completely and totally fills cavity 11 thereby eliminating any voids in the finished encapsulated device. Since the encapsulating material pellets are quickly fluidized by the shear force along the sides of the projections, lower pressures can be used and a shorter encapsulating procedure results. It should be noted that the pressure exerted on the tips of the projections is greatly increased over the pressure that would be exerted against a flat bottom since the projections offer a much thinner surface to counteract the pressure exerted by the plunger. Accordingly, the configured bottom of the molding pot functions to improve the fluidizing mechanism, the fluidizing rate, and rate uniformity. It also prevents the jamming or intermittent jamming of openings 16 and runners 13 from pot 12 to the cavity gates. Not only do the projections lock the pellets in place but they provide sharp edges against which the pellet is split and slides down the sides of the projections, thereby causing by shear force or friction for the pellets to fluidize.

At the completion of filling cavities 11 some encapsulating material will remain in the bottom of pot 12. This remaining material is commonly called a cull, and the cull must be sufficient to avoid the plunger or ram from coming in contact with projections 18 and 21. If contact with the projections is made the final pressure in cavities 11 can be very low causing the encapsulating process to be out of control. In other words, predictive quality will not exist. Ejection of the cull from the bottom of pot 12 is done by ejector pins (not shown) located in runners 13 near the outside diameter near pot 12. If it is necessary to add ejector pins to pot 12 itself, the best location is believed to be in the outer flats of slot 19. It has been found that the contoured or configured bottom of pot 12 does not have to be polished in order to provide the proper fluidization action. To date there has been insufficient wear to determine the wear life of the contoured bottom; however, titanium nitride coating is recommended to increase wear life and enhance separation of the cull from the bottom of pot 12.

By now it should be appreciated that there has been provided an improved configured bottom for a molding pot which greatly increases fluidization of the encapsulating material and avoids blocking of the exiting holes at the bottom of the molding pot. The configured bottom permits use of lower pressures thereby increasing the life of the molding pot, the plunger, the runners, and the gates of the cavities themselves. As mentioned hereinbefore, the configured bottom has resulted in encapsulation being done in 1.2 seconds at a pressure of 28 kg/cm$^2$. With a flat bottom pot, encapsulation took 4.5 seconds at a pressure of 80 kg/cm$^2$.

I claim:

1. A method of encapsulating semiconductor devices, comprising: providing a molding assembly having at least one pot, a cavity for receiving a semiconductor device, and a runner connecting the pot to the cavity; providing at least one projection extending upwardly from the bottom of the pot; providing an opening at the bottom of the pot which connects to the runner, and providing a raised portion at the bottom of the pot; preventing blocking of the opening by aligning the raised portion with respect to the opening to prevent encapsulating material from blocking the opening; placing an encapsulating material inside of the pot; and shearing the encapsulating material against the at least one projection, by pushing downward on the encapsulating material, to fluidize the encapsulating material so it will flow through the runner to the cavity.

2. The method of claim 1 further including leaving a cull at the bottom of the pot large enough to prevent a plunger from coming in contact with the at least one projection.

3. A method of encapsulating semiconductor devices, comprising: providing a molding assembly having at least one pot, a cavity for receiving a semiconductor device, and a runner connecting the pot to the cavity; providing at least one projection extending upwardly from the bottom of the pot; placing an encapsulating material inside of the pot; shearing by pushing downward the encapsulating material against the at least one projection to fluidize the encapsulating material so it will flow through the runner to the cavity; providing an opening at the bottom of the pot which connects to the runner; providing a semi-circular projection at the bottom of the pot having a sloping side from its top to its bottom; and preventing blocking the opening by aligning the sloping side toward the opening at the bottom of the pot thereby preventing non-fluidized encapsulating material from blocking the opening.

4. A method of fluidizing encapsulating material for molding devices, comprising:
providing a mold assembly having at least one pot for receiving encapsulating material, a mold cavity, and a runner connecting the at least one pot to the mold cavity, the at least one pot having a hole for coupling the pot to the runner;
providing a configured bottom in the at least one pot, the configured bottom being raised and having a slot;
placing encapsulating material in the at least one pot; and
shearing the encapsulating material by pressing down on the encapsulating material to create a shearing action of the encapsulating material on the configured bottom to fluidize the encapsulating material.

5. The method of claim 4 further including preventing the encapsulating material from blocking the hole by aligning the slot in the configured bottom away from the hole.

6. The method of claim 4 further including forming a projection in the raised bottom.

7. A method of encapsulating a semiconductor device, comprising:
providing a mold assembly having a pot, a cavity, and a runner connecting a hole at the bottom of the pot to the cavity;
placing the semiconductor device in the cavity;
providing a configured bottom for the pot;
placing encapsulating material in the pot; and
shearing the encapsulating material by pushing the encapsulating material down to the bottom of the pot so the configured bottom creates a shearing force on the encapsulating material and causes the encapsulating material to fluidize and flow through the runner to the cavity.

8. The method of claim 7 further including preventing blocking the hole by aligning the configured bottom of the pot to prevent non-fluidized encapsulating material from blocking the hole.

* * * * *